Patented Mar. 6, 1928.

1,661,736

UNITED STATES PATENT OFFICE.

CHAUNCEY U. PRACHEL, OF ROCHESTER, NEW YORK, ASSIGNOR TO EASTMAN KODAK COMPANY, OF ROCHESTER, NEW YORK, A CORPORATION OF NEW YORK.

PROCESS FOR REDUCING THE VISCOSITY OF NITROCELLULOSIC MATERIALS.

No Drawing.   Application filed February 27, 1925.   Serial No. 12,181.

This invention relates to a process for treating nitrocellulosic materials. One object of the invention is to provide a safe, simple and inexpensive process for treating such materials in order to lower the viscosity characteristics of the nitrocellulose to the desired degree. Another object of the invention is to provide a process in which the lowering of the viscosity characteristics of the nitrocellulose is accomplished without substantial denitration, or in any event with denitration so limited that it does not spoil the solubility of the nitrocellulose in the usual lacquer solvents. Another object of the invention is to provide a process which will not be unduly prolonged, even when it is carried out at atmospheric pressure and at room temperature. Still a further object of the invention is to provide a process in which waste or scrap nitrocellulosic materials may be readily and inexpensively treated by spent or sludge acids without the cost of heating operations. Other objects will hereinafter appear.

It is desirable in many industries to use solutions of nitrocellulose which flow or spray readily and yet are highly concentrated,—that is they have a low viscosity and a high percentage of dissolved nitrocellulose. But many kinds of nitrocellulose can not be made into solutions of this character by simply dissolving them. They must first be treated or transformed before they are suitable.

While suitable kinds of nitrocellulose can be obtained by observing special precautions during nitration, it is easier and far more usual to produce the kinds which have high viscosity characteristics. Moreover, the kinds of nitrocellulose which are found in inexpensive or waste sources, such as pyroxylin waste and photographic film scrap, usually have high viscosity characteristics.

It is, therefore, desirable to provide a safe, simple and inexpensive process for converting the high-viscosity types of nitrocellulose into those of low viscosity characteristics.

I have found that this result may be obtained by treating the nitrocellulosic materials, preferably in a solid colloidized condition, with an aqueous mixed acid solution containing nitric acid. In the preferred embodiment of my invention I use a solution of mineral acids containing also oxides of nitrogen. This permits me to utilize the relatively inexpensive spent or sludge acids which have been used in nitrating cellulose. Such spent or sludge acids can be diluted to serve my purpose and contain both sulfuric and nitric acids together with nitrogen oxides such as $N_2O_3$ and $N_2O_4$. In every case the concentration of the acid is less than that which will further nitrate lower forms of nitrocellulose.

The process may be carried out at atmospheric pressure, thus eliminating the trouble and expense of special pressure vessels working on the autoclave principle. Moreover, the process can be carried on expeditiously at room temperature without the necessity of prolonging heating at high temperatures.

This does not mean that the process can not be accelerated by using higher temperatures and even heating under pressure. Such operations will shorten the time of the action when that is desired. But the period of treatment under atmospheric pressure and room temperature is so comparatively short that I prefer such simple procedure.

During the lowering of the viscosity under the preferred conditions substantially no denitration takes place. If, however, it occurs when using modified conditions, it should not be permitted to go far enough to spoil the solubility of the product in the usual solvents. In the case of nitrocellulosic materials containing from 11 to 12% of nitrogen, for example, a lowering to 9.5% represents about the maximum permissible limit. This corresponds to a drop in nitrogen percentage of not over 2.5%. In the preferred form of my invention, however, denitration is practically undetectable, when the nitrocellulose of lowered viscosity is analyzed.

My process is especially effective when applied to solid colloidized nitrocellulosic materials. Broadly speaking this includes materials which have been formed by dissolving or plasticizing nitrocellulose fibers and working up solid products from the solutions. They may consist chiefly of nitrocellulose in a solid colloidized state. Or they may include softeners, plastifiers or other conditioning agents along with the nitrocellulose. For illustration, pyroxylin waste from the manufacture of articles like combs, may contain camphor; and film scrap, such as pieces of waste or discarded photographic films, like motion picture films, may contain butyl or amyl alcohol. But my invention is, of course, not restricted to any particular high boiling substances (having boiling points above 100° C.) with which the colloidized nitrocellulose may be associated.

I shall now describe one form of my invention by way of example, but it will be understood that the invention is not restricted to the details given therein, except as indicated in the appended claims. The colloidized nitrocellulose, say comb dust or film scrap, is treated in a subdivided form with a 30% solution of spent mixed acids from a cellulose nitrating plant. Such a solution may include approximately 20% $H_2SO_4$, 10% $HNO_3$ and 1 to 2% of nitrogen oxides, say $N_2O_4$. In the case of film scrap, the latter is preferably chopped up before treatment and the gelatinous coatings are removed from the nitrocellulosic base, before the latter is treated with the acid.

The treatment may take place in any suitable acid-resisting vessel and the action conducted for several days at room temperature. Because of the relatively low temperature at which the action takes place and because of the large amount of water that is present, the loss of valuable oxides of nitrogen is reduced to the minimum. All of the pieces of material are kept covered by the liquid.

The duration of the treatment is preferably determined by tests. Representative samples are taken from the treated materials at intervals and tested to see whether the viscosity has reached the desired degree. The time of treatment will vary with the strength of the acid, with the temperature, with the degree of lowered viscosity which it is desired to obtain, and with the viscosity characteristics of the material at the start of the treatment. When the colloidized nitrocellulose has initially a fairly low viscosity characteristic, it will in some cases be transformed into material suitable for spraying or lacquer work in a half day. On the other hand high viscosity nitrocellulosic material, such as film scrap, for instance, may require as long as six days. Four days is a representative time at room temperature, say 21° C.

After the treatment is finished the transformed nitrocellulosic material is freed from the acid. This may be done by draining off the bulk of the acid from the material and then washing the latter in successive changes of water. To hasten the action the water may be heated without injury to the product. It may be treated, for example, in running water for about a week and toward the end of the week it may be washed in several changes of heated water at about 75° C. for instance. Finally the material is either dried or dehydrated with known aqueous liquids. It is then ready for use. The material is not denitrated to 9.5% nitrogen and, therefore, is not harmfully denitrated. In fact, it usually remains substantially undenitrated by this treatment.

Instead of using a 30% solution of mixed acid, I may employ a weaker solution and carry on the action for a slightly longer time. Thus I have found a 20% solution of spent acid to be very effective when working even at room temperature. Instead of mixed acids I may use a single acid such as nitric acid, preferably containing nitrogen oxides. Thus a 6% aqueous solution of nitric acid containing 1.2% of nitrogen oxides has been found to operate effectively at room temperature during several days treatment.

In general the preferred baths contain from 5 to 20% of $HNO_3$—10 to 30% of $H_2SO_4$ and from ½ to 10% of nitrogen oxides.

Having thus described my invention, what I claim as new and desire to secure by Letters Patent is:

1. The process of treating solid colloidized nitrocellulosic materials, which comprises acting at atmospheric pressure on them with an aqueous mixed mineral acid solution containing nitric acid until the viscosity characteristics of the nitrocellulose are lowered, said solution being of insufficient strength to increase the nitration of the nitrocellulose.

2. The process of treating solid colloidized nitrocellulosic materials, which comprises acting at room temperature on said materials with an aqueous solution of mineral acid containing nitric acid and oxides of nitrogen until the viscosity characteristics of the nitrocellulose are lowered, said solution being of insufficient strength to further nitrate said nitrocellulose and its action being stopped before the nitrogen in said nitrocellulose falls below 9.5%.

3. The process of treating solid colloidized nitrocellulosic materials, containing a high boiling organic compound, which comprises acting at atmospheric pressure on said materials with an aqueous solution containing sulfuric acid and nitric acid and at least ½% of oxides of nitrogen, which tends to lower their nitrogen content until the viscosity characteristics of the nitrocellulose are lowered, but stopping the action before the percentage of nitrogen in the nitrocellulose is lowered through more than 2.5%.

4. The process of treating nitrocellulosic film scrap, which comprises acting thereon at atmospheric pressure with a mixture of water and spent acids from a nitrating bath until the viscosity characteristics of the nitrocellulose in the film scrap are reduced, but stopping the action before the proportion of nitrogen in said nitrocellulose drops to 9.5%.

5. The process of treating solid colloidized nitrocellulosic material, which comprises acting at atmospheric pressure thereon with an aqueous mixed mineral acid solution containing nitric acid until the viscosity characteristics of the nitrocellulose are lowered, said solution being of insufficient strength to increase the nitration of said nitrocellulose.

6. The process of treating solid colloidized nitrocellulosic material, which comprises acting at atmospheric pressure on said materials with an aqueous solution of mineral acid containing oxides of nitrogen until the viscosity characteristics of the nitrocellulose are lowered, said solution being of insufficient strength to increase the nitration of said material, and its action being stopped before the nitrogen in said nitrocellulose falls below 9.5%.

7. The process of treating solid colloidized nitrocellulosic material containing a high boiling organic compound, which comprises treating said material at atmospheric pressure with an aqueous solution of sulfuric and nitric acids containing at least ½% of oxides of nitrogen for ½ to 6 days, the action being stopped when the viscosity characteristics of the nitrocellulose have been reduced but before the percentage of nitrogen in the nitrocellulose is lowered through more than 2.5%, the strength of the bath being insufficient to increase the nitrogen in the nitrocellulose.

8. The process of treating nitrocellulosic film scrap, which comprises immersing said scrap at atmospheric pressure in a mixture of water and spent acids from a nitration bath, during ½ to 6 days, the action being stopped when the viscosity characteristics of the nitrocellulose are reduced but before the percentage of nitrogen in the nitrocellulose can drop below 9.5%, the strength of the bath being insufficient to increase the percentage of the nitrogen in the nitrocellulose.

9. The process of treating solid colloidized nitrocellulosic material, which comprises acting on said material at atmospheric pressure and at room temperature with an aqueous mixed mineral acid solution containing nitric acid, until the viscosity characteristics of the nitrocellulose are reduced, the strength of the solution being insufficient to increase the nitration of the nitrocellulose.

10. The process of treating solid colloidized nitrocellulosic material, which comprises acting on said material at atmospheric pressure and at room temperature with an aqueous solution of mineral acid containing oxides of nitrogen, until the viscosity characteristics of the nitrocellulose are reduced, the strength of the solution being insufficient to increase the nitration of the nitrocellulose.

11. The process of treating solid colloidized nitrocellulosic material containing a high boiling organic compound, which comprises acting on said material at atmospheric pressure and room temperature for ½ to 6 days with an aqueous solution containing sulfuric and nitric acids and more than ½% of oxides of nitrogen.

12. The process of treating nitrocellulosic film scrap, which comprises immersing said scrap at atmospheric pressure and room temperature for ½ to 6 days in a mixture of water and spent acids from a nitration bath, said mixture comprising nitric acid, sulfuric acid and nitrogen oxides.

13. The process of treating solid colloidized nitrocellulosic material, which comprises immersing said material in an aqueous bath containing from 5 to 20% of nitric acid, from 10 to 30% of sulfuric acid and from ½ to 10% of nitrogen oxides, the action being stopped when the viscosity characteristics of the nitrocellulose are reduced, but before the nitrogen proportion in the nitrocellulose is lowered below 9.5%.

14. The process of treating nitrocellulosic film scrap, which comprises immersing said scrap at atmospheric pressure and room temperature for ½ to 6 days in an aqueous bath containing from 5 to 20% of nitric acid, from 10 to 30% of sulfuric acid and from ½ to 10% of nitric oxides.

Signed at Rochester, New York, this 12th day of February, 1925.

CHAUNCEY U. PRACHEL.